July 19, 1949.　　　　　J. R. BOYKIN　　　　2,476,804
CONTROL CIRCUIT
Filed June 25, 1945
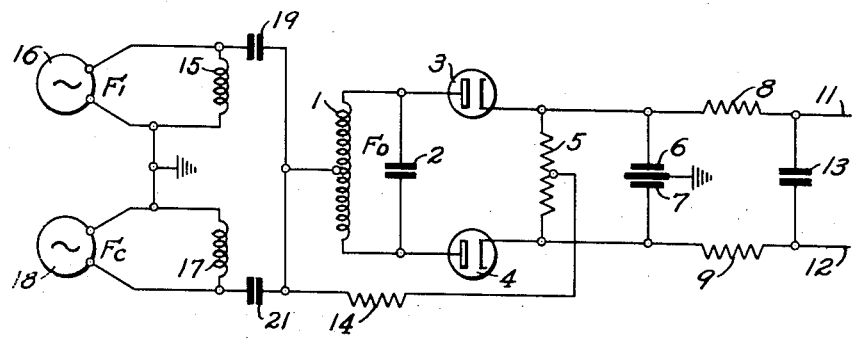
WITNESSES:
James F. Young
Nw. C. Groome
INVENTOR
John R. Boykin.
BY
F. W. Lyle
ATTORNEY Patented July 19, 1949

2,476,804

UNITED STATES PATENT OFFICE 2,476,804

CONTROL CIRCUIT

John R. Boykin, Baltimore, Md., assignor to Westinghouse Electric Corporation, East Pittsburgh, Pa., a corporation of Pennsylvania Application June 25, 1945, Serial No. 601,390

6 Claims. (Cl. 250—27.1)

My invention relates to frequency measuring systems and in particular relates to arrangements for obtaining a direct current voltage which is proportional to the difference in frequency of an alternating current source to be measured and an alternating current source of standard frequency. Such a direct current voltage may be employed in ways well known in the art to automatically adjust the frequency of the source undergoing measurement to equality, or to some other desired relationship, to the standard frequency source.

Arrangements are now known in the art for producing a direct current voltage which is proportional, both in absolute magnitude and in sign, to the difference between the frequency of an alternating current source to be measured and the resonant frequency of a local tuned circuit. For example, S. W. Seeley Patent No. 2,121,103 illustrates such an arrangement, widely known in the art today as the Seeley discriminator. However, for many purposes it would be desirable to have an arrangement in which a direct current voltage proportional in magnitude and sign to the difference between the frequency of an alternating source to be measured and a constant frequency; and the Seeley discriminator fails of satisfaction under such circumstances because of the fact that the resonant frequency of its tuned circuit undergoes substantial changes with certain variables, such as temperature, aging and the like. My invention avoids this defect of the Seeley circuit by using as the standard of comparison, not the resonant frequency of a local circuit comprising inductors and capacitors, but the frequency of a local alternating current generator which may be controlled by piezo-electrical crystals or other means so that it undergoes far less random or undesired changes than does the resonant frequency of an ordinary tuned circuit.

One object of my invention is accordingly to provide an arrangement for producing a direct current voltage which is proportional to the difference between a frequency to be measured and the frequency of a piezo-electric crystal controlled oscillator.

Another object of my invention is to produce an arrangement in which a direct current voltage is produced which is proportional to the frequency difference between an alternating current source to be measured and an alternating current source of substantially invariable frequency.

Still another object of my invention is to provide an arrangement in which the frequency of a variable alternating current source is maintained in constant relationship to the frequency of a piezo-electric crystal controlled oscillator.

Other objects of my invention will become apparent upon reading the following description taken in connection with the drawings, in which the single figure is a schematic diagram of a circuit embodying the principles of my invention.

Referring in detail to the drawing, an inductor 1 shunted by a capacitor 2 has its outside terminals connected through a pair of similarly directed diodes 3, 4 to the outside terminals of a resistor 5. The outside terminals of the resistor 5 are shunted by a pair of series capacitors 6, 7 having a common terminal grounded. The outside terminals of resistor 5 are likewise connected through a pair of similar series resistors 8, 9 to the outside terminals 11, 12 of another capacitor 13. The midpoint of the resistor 5 is connected through a channel embodying a resistor 14 to the midpoint of the inductor 1. The circuit so far described will be recognized by those skilled in the art as similar to the direct current output circuit of the well known Seeley discriminator.

An inductor 15 having a low mutually-inductive coupling to the inductor 1 is energized from a source of alternating current 16 of which the frequency is to be measured or adjusted. A second inductor 17 likewise having low mutually-inductive coupling to the inductor 1 is supplied with current from a source of standard frequency alternating current 18, such, for example, as a crystal controlled oscillator of any type well known in the art. Two terminals of the inductors 15 and 17 are grounded, and the other terminals are respectively connected through a pair of capacitors 19, 21 to the midpoint of the inductor 1. The inductor 1 and the capacitor 2 are tuned to resonate at a frequency approximately equal to that of the source 18.

Considering for the moment that the source 16 is absent from the above described arrangement, it will be apparent to those skilled in the art that the inductor 17 and inductor 1 would react on each other like the primary and secondary windings of a Seeley discriminator and produce a direct current output across the terminals 11, 12 which is proportional both in magnitude and sign to the difference of frequency between the source 18, and the frequency to which the inductor 1 and capacitor 2 are tuned. Otherwise expressed, the direct current voltage $E_3$ across the terminals 11, 12 may be expressed by the equation (1) $$E_3 = AE_{17}(F_c - F_d)$$

where $F_c$ is the frequency of source 18, $F_d$ is the resonant frequency to which the inductor 1 and the capacitor 2 are tuned, $E_{17}$ is the voltage impressed across the inductor 17, and A is a constant depending in ways well known to those skilled in the art on the parameters of the electrical constants of the circuit embodying inductor 1. Similarly, if the source 18 were absent from the circuit and the source 16 present, the output voltage $E_4$ across the terminals 11, 12 would be expressed by the following equation (2)  $$E_4 = BE_{15}(F_1 - F_d)$$

in which $F_1$ is the frequency of the source 16, $E_{15}$ the voltage impressed across the inductor 15 and B is a constant of similar type to A.

When the sources 18 and 16 are properly poled relative to each other, the voltages $E_3$ and $E_4$ may be made to oppose each other so that the net output voltage across the terminals 11 and 12, when sources 16 and 18 are both connected as shown in the figure, will be (3)  $$E_0 = E_3 - E_4 = AE_{17}F_c - AE_{17}F_d - BE_{15}F_1 + BE_{15}F_d$$

Now, if we so adjust A and B that (4)  $$AE_{17} = BE_{15}$$

it results that (5)  $$E_0 = AE_{17}(F_c - F_1)$$

It is thus evident that with the circuit shown in the figure there will result a direct current voltage across the terminals 11, 12 which is proportional to the difference in frequency between the source 16 to be measured and the standard-frequency source 18. Since crystal controlled oscillators and other sources are known which produce oscillations of frequency much less susceptible to unwanted variations than is the resonant frequency of circuits comprising inductors and capacitors, my above described arrangement provides a measuring device for unknown frequencies which is much more precise and reliable than the Seeley discriminator of the prior art.

The direct current voltage across the terminals 11, 12 may be arranged in ways well known in the art to operate through polarized relays and the like to vary the frequency of the source 16 until it is equal to that of the standard-frequency source 18. The U. S. Patent No. 2,380,947 to M. G. Crosby shows the voltage across resistors 101 and 103 in Fig. 3 adjusting a capacitor 118 for a similar purpose.

While I have described my circuit as embodying a specific arrangement (i. e. the Seeley discriminator) for obtaining an output voltage proportional to the frequency difference between a resonant circuit and an alternating current source, it will be evident to those skilled in the art that the same principles will make it possible to apply any other arrangement which produces an output voltage proportional in magnitude and sign to the frequency difference between a resonant circuit and an alternating current source in such a way as to make two resultant direct current voltges, each proportional to the frequency difference between the resonant circuit and one alternating current voltage, back each other. If this is done, the effect on the output of resonant-frequency variations in the tuned circuit disappears, and an output voltage is obtained proportional to the frequency difference between the two alternating current sources. If one of these sources is, as in the system I have described, a standard frequency source, a means of measuring, or regulating, the frequency of the other source results.

I claim as my invention:

1. In combination a resonant circuit, rectifiers poled in opposition to supply current to an output circuit from separate points on said resonant circuit, a channel connecting a point of intermediate potential on said output circuit and a point of intermediate potential on said resonant circuit, and a pair of alternating current circuits, each having loose inductive coupling to said resonant circuit.

2. In combination, a resonant circuit, rectifiers poled in opposition to supply current to an output circuit from separate points on said resonant circuit, a channel connecting a point of intermediate potential on said output circuit and a point of intermediate potential on said resonant circuit, a first alternating current circuit supplied from one source in loose inductive coupling to said resonant circuit, and a second alternating current circuit supplied from a second source in loose inductive coupling to said resonant circuit.

3. In combination, a resonant circuit, rectifiers poled in opposition to supply current to an output circuit from separate points on said resonant circuit, a channel connecting a point of intermediate potential on said output circuit and a point of intermediate potential on said resonant circuit, a pair of inductors having one terminal of each connected through a capacitor to said point of intermediate potential on said resonant circuit, and having their other terminals connected together.

4. In combination, a resonant circuit, rectifiers poled in opposition to supply current to an output circuit from separate points on said resonant circuit, a channel connecting a point of intermediate potential on said output circuit and a point of intermediate potential on said resonant circuit, a first inductor in loose inductive coupling to said resonant circuit and having one terminal connected through a capacitor to said point of intermediate potential on said resonant circuit, a source of standard frequency supplying current to said first inductor, a second inductor in loose inductive coupling to said resonant circuit and having a terminal connected through a capacitor to said point of intermediate potential on said tuned circuit, means for interconnecting other terminals of said first and second inductors, and means for supplying current of frequency to be measured to said second inductor.

5. In combination with a first inductor shunted by a first capacitor, oppositely poled rectifiers respectively connected to opposite terminals of said inductor and supplying current to opposite terminals of an output circuit, a channel connecting an intermediate point on said output circuit and an intermediate point on said first inductor, a second inductor having one terminal connected through a second capacitor to said intermediate point on said first inductor, a third inductor having one terminal connected through a capacitor to said intermediate point on said first inductor, and a connection between the remaining terminals of said second and third inductors.

6. In combination with a first inductor shunted by a first capacitor, oppositely poled rectifiers respectively connected to opposite terminals of said inductor and supplying current to opposite terminals of an output circuit, a channel connecting an intermediate point on said output circuit and an intermediate point on said first inductor, a second inductor having one terminal connected through a second capacitor to said intermediate point on said first inductor, a third inductor having one terminal connected through a capacitor to said intermediate point on said first inductor, a connection between the remaining terminals of said second and third inductors, and means for supplying said second inductor with current from a standard-frequency source and for supplying said third inductor with current from a source of frequency to be measured.

JOHN R. BOYKIN.

REFERENCES CITED

The following references are of record in the file of this patent:

UNITED STATES PATENTS

| Number | Name | Date |
|---|---|---|
| 2,223,835 | Smith | Dec. 3, 1940 |
| 2,377,326 | Crosby | June 5, 1945 |
| 2,380,947 | Crosby | Aug. 7, 1945 |
| 2,400,648 | Korman | May 21, 1946 |